United States Patent
Höller et al.

(10) Patent No.: US 12,092,812 B2
(45) Date of Patent: Sep. 17, 2024

(54) DEVICE FOR THE TWO-DIMENSIONALLY SCANNING BEAM DEFLECTION OF A LIGHT BEAM

(71) Applicant: Carl Zeiss AG, Oberkochen (DE)

(72) Inventors: Frank Höller, Aalen (DE); Kerstin Winkler, Göttingen (DE); Felix Koch, Jena (DE)

(73) Assignee: Carl Zeiss AG, Oberkochen (DE)

( * ) Notice: Subject to any disclaimer, the term of this patent is extended or adjusted under 35 U.S.C. 154(b) by 939 days.

(21) Appl. No.: 17/130,515

(22) Filed: Dec. 22, 2020

(65) Prior Publication Data
US 2021/0191110 A1    Jun. 24, 2021

(30) Foreign Application Priority Data

Dec. 23, 2019 (DE) .................. 10 2019 135 759.4

(51) Int. Cl.
*G02B 26/10* (2006.01)
*G01S 7/48* (2006.01)
(Continued)

(52) U.S. Cl.
CPC .......... *G02B 26/108* (2013.01); *G01S 7/4808* (2013.01); *G01S 7/4817* (2013.01); *G01S 17/08* (2013.01); *G02B 5/04* (2013.01); *G02B 26/0891* (2013.01); *G02B 26/101* (2013.01); *G02B 26/106* (2013.01)

(58) Field of Classification Search
None
See application file for complete search history.

(56) References Cited

U.S. PATENT DOCUMENTS 6,118,518 A    9/2000 Hobbs
11,162,789 B2 * 11/2021 Lodin .................. G01J 3/00
(Continued)

FOREIGN PATENT DOCUMENTS

DE    102018203316 A1    9/2019
DE    102019107574 A1    10/2019
(Continued)

OTHER PUBLICATIONS

Carl Zeiss AG, European Search Report, EP Application No. 20214999.3, May 20, 2021, 8 pgs.
(Continued)

*Primary Examiner* — Luke D Ratcliffe
(74) *Attorney, Agent, or Firm* — Morgan, Lewis & Bockius LLP

(57) ABSTRACT

A device for two-dimensionally scanning beam deflection of a light beam has spectrally tunable light source that emits a light beam having a time-varying wavelength. The device further comprises a first optical component that produces a first beam deflection. The first beam deflection causes the light beam to be deflected wavelength-dependently in a first direction. A second optical component produces a second beam deflection which causes the light beam to be deflected in a second direction different to the first direction. The second optical component comprises a prism pair comprising two prisms that are rotatably arranged successively in a beam path of the light beam. The two prisms are configured to perform continuous counter-rotational movements.

18 Claims, 6 Drawing Sheets

(51) Int. Cl.
G01S 7/481 (2006.01)
G01S 17/08 (2006.01)
G02B 5/04 (2006.01)
G02B 26/08 (2006.01)

(56) References Cited

U.S. PATENT DOCUMENTS

| | | |
|---|---|---|
| 2013/0241761 A1* | 9/2013 | Cooper ................. G01S 7/4817 342/54 |
| 2015/0073938 A1 | 3/2015 | Chuma et al. |
| 2017/0155225 A1* | 6/2017 | Villeneuve .......... H01S 3/06754 |
| 2019/0302237 A1 | 10/2019 | Singer |
| 2021/0026015 A1 | 1/2021 | Davydenko |
| 2021/0263303 A1* | 8/2021 | Dong ................... G02B 26/101 |

FOREIGN PATENT DOCUMENTS

| | | |
|---|---|---|
| EP | 3797328 A1 | 3/2021 |
| WO | WO 2019232585 A1 | 12/2019 |
| WO | WO 2020/062718 A1 | 4/2020 |

OTHER PUBLICATIONS

Zeiss, German Office Action, German Application No. DE 10 2019 135 759.4, Oct. 1, 2020, 32 pgs.

* cited by examiner

DEVICE FOR THE TWO-DIMENSIONALLY SCANNING BEAM DEFLECTION OF A LIGHT BEAM

CROSS-REFERENCE TO RELATED APPLICATIONS

The present application claims benefit of German patent application 10 2019 135 759.4 filed on Dec. 23, 2019. The entire disclosure of this earlier patent application is incorporated herein by reference.

BACKGROUND OF THE INVENTION

Field of the Invention

The invention relates to a device for the two-dimensionally scanning beam deflection of a light beam. The device may, in particular, be used for scanning beam deflection during the determination of distances of both moving and stationary objects and for determination of the topography or shape of one or more spatially extended three-dimensional objects.

Prior Art

For the optical distance measurement of objects, inter alia a measurement principle also referred to as LIDAR is known, in which an optical signal time-varied continuously in its frequency is radiated towards the object in question and is evaluated after reflection has taken place back from the object.

Figure 5A:
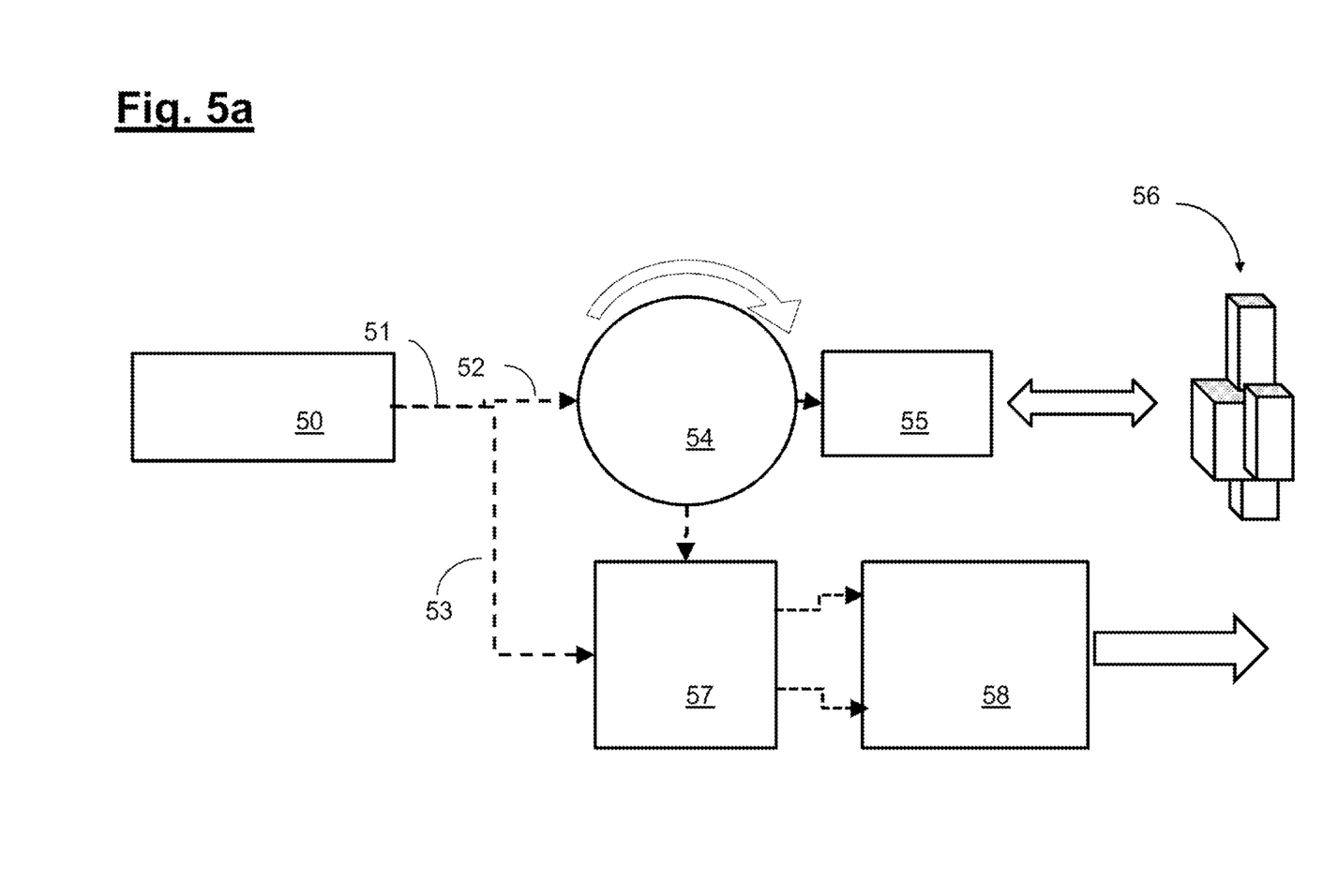
FIGS. 5a-5b show schematic representations to explain the structure and mode of action of a device for distance determination.

FIG. 5a shows, merely in a schematic representation, a structure fundamentally known per se in which a signal 51 with a time-varied frequency (also referred to as "chirp") emitted by a spectrally tunable light source 50 is split into two partial signals, this splitting being carried out by means of a beam splitter, which is not represented (for example a semitransparent mirror or a fiber-optic splitter). The two partial signals are coupled by means of a signal coupler 57 and superimposed with one another on a detector 58, the first partial signal reaching the signal coupler 57 and the detector 58 as a reference signal 53 without reflection at the object denoted by "56". The second partial signal entering the signal coupler 57, and respectively the detector 58, on the other hand travels as a measurement signal 52 via an optical circulator 54 and a scanning unit 55 to the object 56, is reflected back by the latter and therefore reaches the signal coupler 57 and the detector 58 with a time delay and correspondingly modified frequency in comparison with the reference signal 53.

Figure 5B:
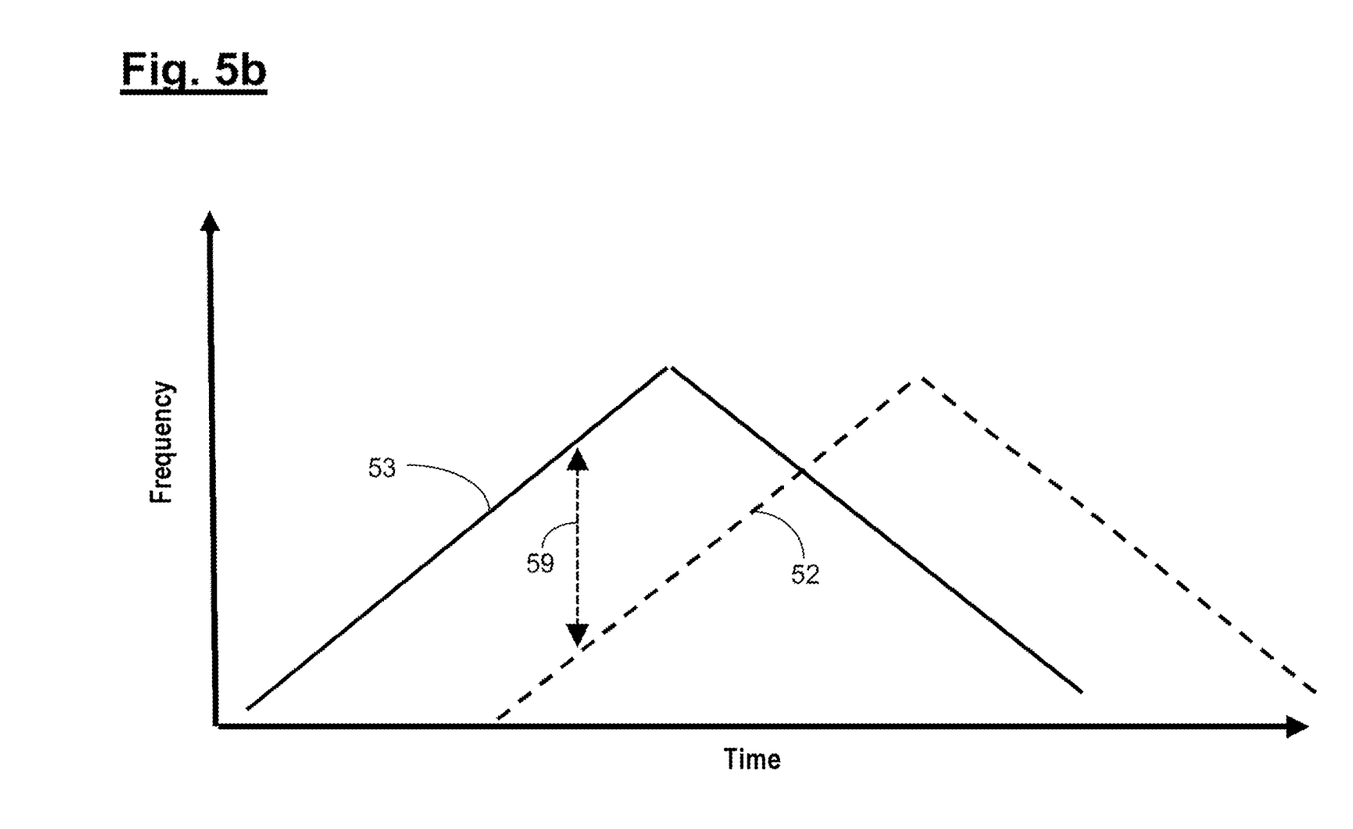

By means of an evaluation unit (not represented), the detector signal delivered by the detector 58 is evaluated relative to the measurement device or the light source 50, the differential frequency 59, recorded at a particular time and represented in the diagram of FIG. 5b, between the measurement signal 52 and the reference signal 53 being characteristic of the distance of the object 56 from the measurement device, or the light source 50. According to FIG. 5b, in order to obtain additional information regarding the relative velocity between the object 56 and the measurement device or the light source 50, the time-dependent frequency profile of the signal 51 emitted by the light source 50 may also be configured in such a way that there are two sections, in which the time derivative of the frequency generated by the light source 50 is mutually opposite.

In practice, even for (possibly also moving) objects located at relatively large distances, which may for example be vehicles in road traffic, there is a need to achieve a maximally accurate and reliable distance measurement. In this case, with a view to a maximally high reliability and lifetime of the device for distance determination, it is furthermore desirable to avoid or minimize the use of scanning or deflecting mirrors when scanning the respective object.

In this case, depending on the application, there is a need to achieve a maximally large field of view (FOV) which is "to be sampled" with position resolution by the respective measurement beam. For example, use in road traffic requires a two-dimensional position resolution (perpendicularly to the measurement beam direction) of N*M measurement points or pixels, where N and M are respectively preferably intended to be more than 100.

However, carrying out a two-dimensional scanning process with a sufficiently high speed and high resolution, for instance when scanning objects such as vehicles, represents a great challenge in practice. In this case, for example, when using MEMS-based scanning mirrors, it proves problematic to combine large mirror diameters with a sufficiently high scanning speed, the achievable deflection angles also being limited because of the solid-state articulations used. Further approaches based on mechanical scanning mirrors or based on a combination of rotation and dispersion scanners have, inter alia, the disadvantage of a relatively complex structure and a significant installation space requirement.

SUMMARY OF THE INVENTION

Against the aforementioned background, it is an object of the present invention to provide a device for the two-dimensionally scanning beam deflection of a light beam, which allows a sufficiently fast two-dimensional scanning process while avoiding the problems described above.

In an aspect of the invention, this object is achieved by a device for the two-dimensionally scanning beam deflection of a light beam which comprises:
- at least one spectrally tunable light source for emitting a light beam with a time-varying wavelength;
- a first optical component for producing a first beam deflection, by means of which partial beams originating from the light beam can respectively be deflected wavelength-dependently in a first direction; and
- a second optical component for producing a second beam deflection, by means of which the partial beams deflected by the first optical component are respectively deflected in a second direction different to the first direction before or after this deflection;
- wherein the second optical component comprises at least one prism pair consisting of prisms rotatably arranged successively in the beam path.

The invention is firstly based on the idea that, in order to carry out a two-dimensional scanning beam deflection (for the purpose of two-dimensional sampling of an object), an optical component (for example a grating or a grating prism) acting continuously, or monotonically, in terms of the wavelength-dependent beam deflection may be combined with a further component which causes an (in particular periodic) to and fro movement of the respective beam during the scanning process in another direction (typically perpendicular to the first beam deflection), in other words thus repeatedly passes through one and the same deflection range. As a result, a two-dimensional scanning process may therefore be achieved with a high speed.

The invention in this case relies, in particular, on the concept of carrying out the two-dimensionally scanning beam deflection by using at least two optical components which are arranged successively in relation to the light propagation direction, or through which light passes successively, in combination with at least one light source which is spectrally tunable in its wavelength, one of these components causing a wavelength-dependent beam deflection and the other of these components having at least one prism pair consisting of prisms rotatably arranged successively in the beam path.

The use made according to the invention of a prism pair consisting of prisms rotatably arranged successively in the beam path in order to carry out a two-dimensional scanning process—in combination with a wavelength-dependent first beam deflection, for example caused by a grating or grating prism—in this case has inter alia the advantage that a periodic to and fro movement of the respective beam may already be induced by said prism pair through a continuous counter-rotational movement of the prisms, with the result that the prisms do not experience any acceleration (i.e. no optical elements need to be moved to and fro) and, at the same time, a both robust and compact structure is achieved. In this case, the compactness of the device according to the invention is due to the fact that the lateral dimensions (i.e. the dimensions perpendicular to the optical beam path, or the light propagation direction) do not in fact need to be significantly greater than the corresponding beam dimensions.

Furthermore, the use made according to the invention of a wavelength-dependently beam deflecting first optical component (for example a grating or a grating prism), in combination with the aforementioned prism pair, has the advantage that it is also possible to work with a plurality of light beams with a different wavelength or a different tuning range (by using a plurality of light sources and/or a frequency comb) in the sense of time-parallelization of the scanning process.

According to one embodiment, the first optical component comprises at least one grating. This grating may be a grating operated in transmission or also a grating operated in reflection.

According to one embodiment, the first optical component comprises at least one grating prism. Because of the configuration of the (wavelength-dependently operating) first optical component as a high-grade-dispersive grating prism, the tuning range, which is required for the two-dimensional scanning process, of the at least one light source may be selected to be relatively small (for example 1500 nm±100 nm).

According to one embodiment, the prisms of the prism pair are configured as achromatic prisms. In this way, a wavelength-independent functionality of the second optical component (the beam deflection of which is intended to be based on the prism rotation and not on the wavelength tuning) may be ensured.

According to one embodiment, the second direction is perpendicular to the first direction.

According to one embodiment, the second optical component is arranged after the first optical component in relation to the light propagation direction. This is advantageous insofar as the angles of incidence, existing for the first component (for example the grating prism), of the light remain unchanged independently of the rotation angle of the prisms, and furthermore the lateral dimensions of the first component of the grating prism can be minimized because of the placement at the light entry in the overall arrangement consisting of the first and second components. It should, however, be pointed out that the second optical component may in principle alternatively be arranged after or before the first optical component in relation to the optical beam path.

According to one embodiment, the at least one spectrally tunable light source is configured for the parallel emission of a multiplicity of light beams respectively with a time-varying wavelength.

According to one embodiment, the device furthermore comprises at least one polarizer. By means of such a polarizer, the polarization state of the at least one light beam emitted by the light source may be adjusted in such a way that the diffraction efficiency of a grating or grating prism forming the first component is maximized.

The invention furthermore relates to the use of a device having the features described above in a LIDAR system for the scanning distance determination of an object.

The invention furthermore relates to a LIDAR system for the scanning distance determination of an object, comprising
at least one spectrally tunable light source for emitting a light beam with a time-varying wavelength;
an evaluation unit for determining a distance of the object on the basis of measurement signals respectively originating from the light beam and reflected at the object and reference signals not reflected at the object; and
a scanning unit, which creates a wavelength-dependent angle distribution of the measurement signals deflected towards the object;
wherein this scanning unit comprises a first optical component for producing a first beam deflection, by means of which partial beams originating from the light beam can respectively be deflected wavelength-dependently in a first direction, and a second optical component for producing a second beam deflection, by means of which the partial beams deflected by the first optical component are respectively deflected wavelength-dependently in a second direction different to the first direction before or after this deflection, wherein the second optical component comprises at least one prism pair consisting of prisms rotatably arranged successively in the beam path.

The invention will be explained in more detail below with the aid of exemplary embodiments which are represented in the appended drawings.

BRIEF DESCRIPTION OF THE DRAWINGS

Further features and advantages of the invention will become apparent from the following description of exemplary embodiments with reference to the drawings, in which.

DETAILED DESCRIPTION OF EMBODIMENTS

The basic possible structure and the functionality of a device according to the invention for two-dimensionally scanning beam deflection will be described below with the aid of different embodiments with reference to the schematic drawings of FIG. 1-4.

The device according to the invention has at least one light source, which is spectrally tunable (i.e. it is variable in terms of the wavelength of the emitted light), for emitting at least one light beam with a time-varying wavelength. In further embodiments, a plurality of light beams with a different wavelength or a different tuning range may also be provided for the purpose of time-parallelization of the scanning process, which may in turn be carried out by using a plurality of light sources or alternatively also by generating a frequency comb.

A common feature of the embodiments described below is that—for the two-dimensionally scanning beam deflection of at least one light beam with a time-varying wavelength produced respectively by a spectrally tunable light source— at least two separate optical components (respectively causing beam deflections in a mutually different direction) are used. In this case, one of these beam deflections takes place wavelength-dependently (for example via a grating or grating prism), the other of these beam deflections being caused by means of a prism pair consisting of prisms rotatably arranged successively in the beam path. In this case, a periodic variation of the deflection angle in the relevant direction—different to the beam deflection of the first optical component—is induced in the latter prism pair in particular by means of a continuous counter-rotational movement of the prisms, which does not require any acceleration or to and fro movement of the prisms, i.e. effectively a continuous rotational movement of the prisms is converted into a periodic scanning movement of the respective measurement beam.

FIG. 1a-1d and FIG. 2a-2d show schematic representations to explain a first embodiment. In this case, light of a spectrally tunable light source (not represented in FIG. 1-2) strikes first the first component, which is denoted by "110" and in the exemplary embodiment is configured as a (stationary) grating prism, and then the second component denoted by "120" and formed by the aforementioned prism pair.

The representations of FIG. 1a-1d respectively show the arrangement in plan view (i.e. in the x-z plane in the coordinate system indicated) and for different rotation angles of the counter-rotating prisms of the component 120, the position according to FIG. 1a corresponding to a rotation angle of 0°, the position according to FIG. 1b corresponding to a rotation angle of 90°, the position according to FIG. 1c corresponding to a rotation angle of 180° and the position according to FIG. 1d corresponding to a rotation angle of 270°. In this case, the counter-rotating prisms of the component 120 in the embodiment shown are rounded prisms.

FIG. 2a-2d show similar representations for the side view (i.e. in the y-z plane in the coordinate system indicated), again the position according to FIG. 2a corresponding to a rotation angle of 0°, the position according to FIG. 2b corresponding to a rotation angle of 90°, the position according to FIG. 2c corresponding to a rotation angle of 180° and the position according to FIG. 2d corresponding to a rotation angle of 270°.

Figure 1:
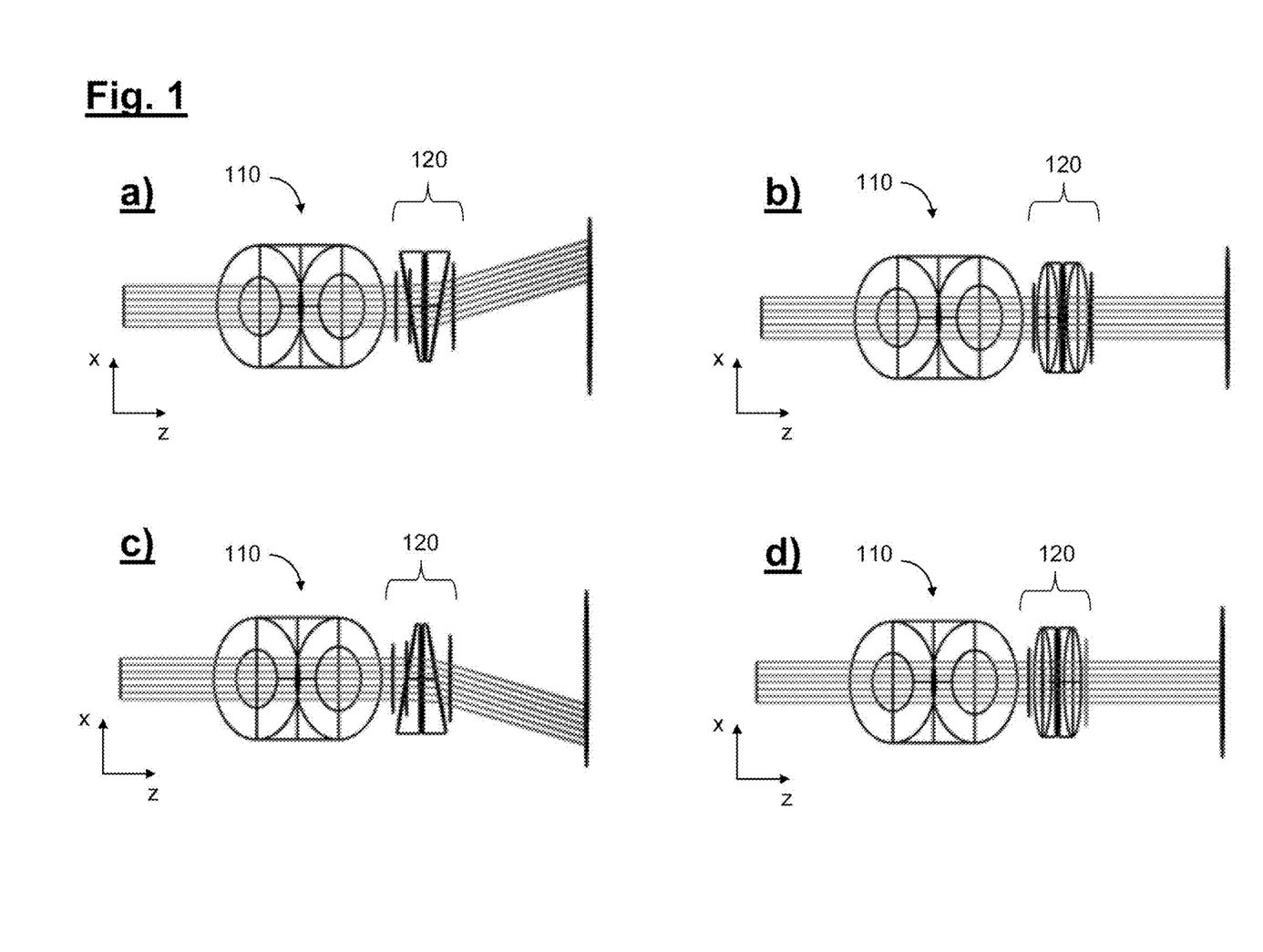
FIGS. 1-4 show schematic representations to explain different embodiments of the invention.
Figure 2:
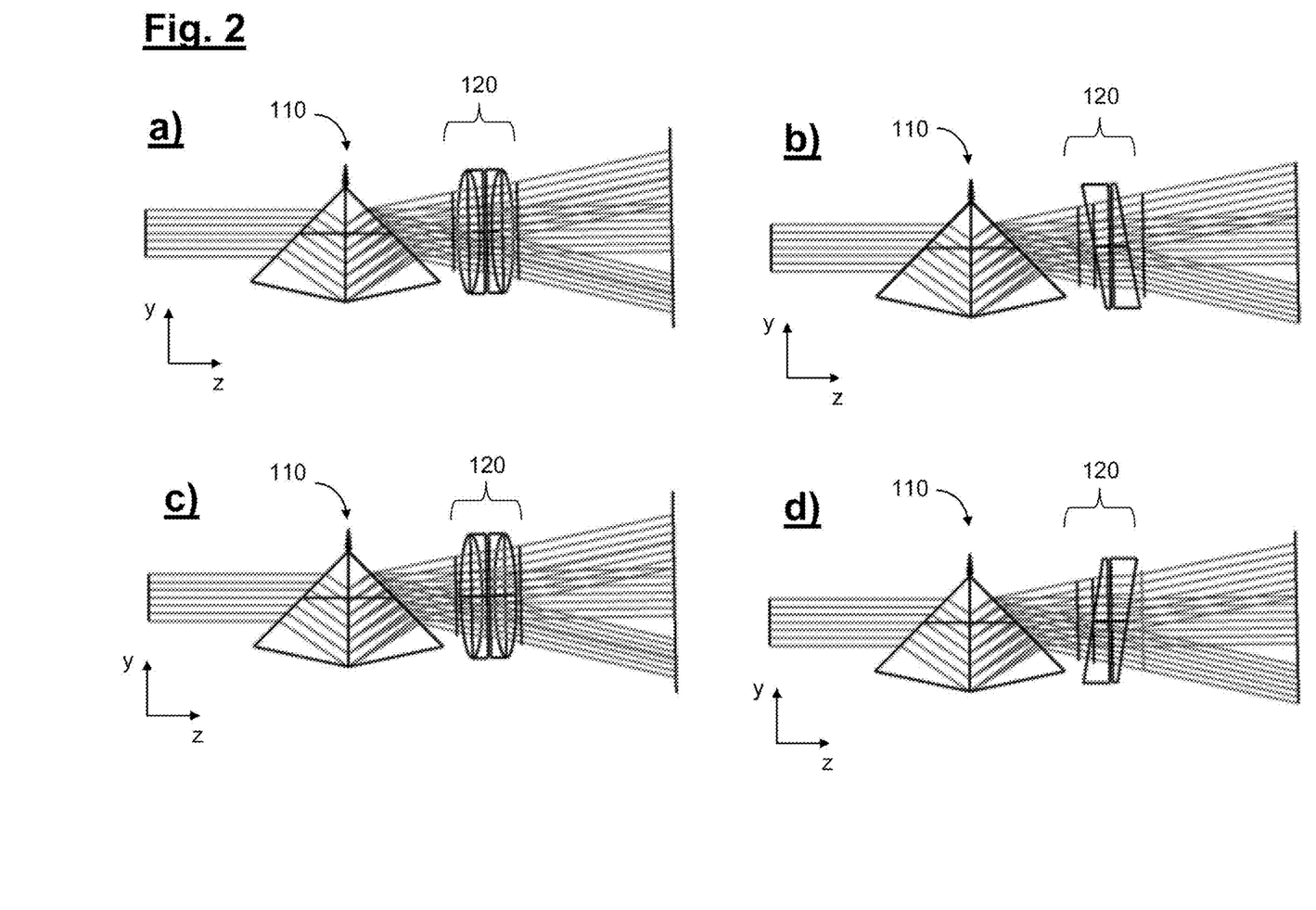
Figure 3:
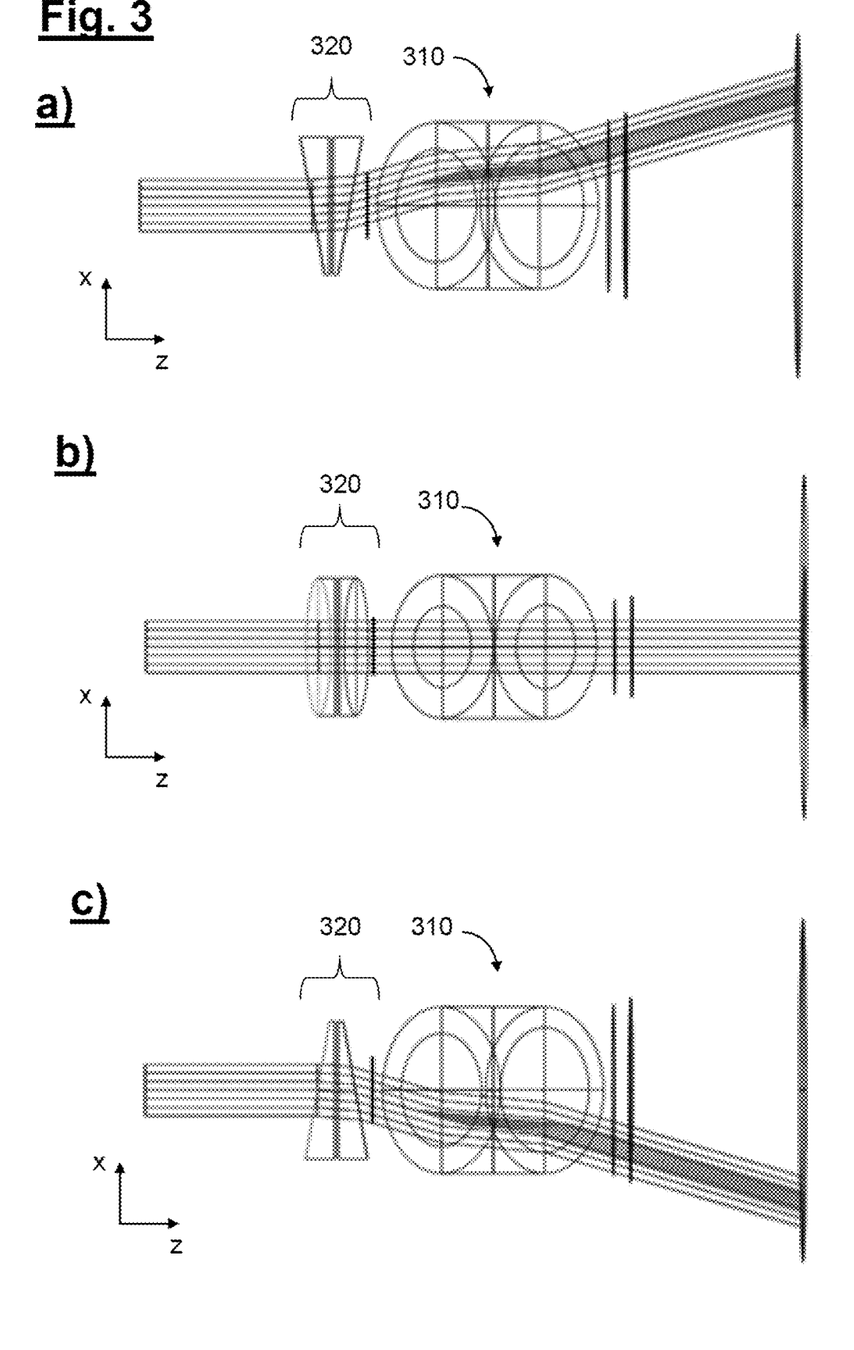
Figure 4:
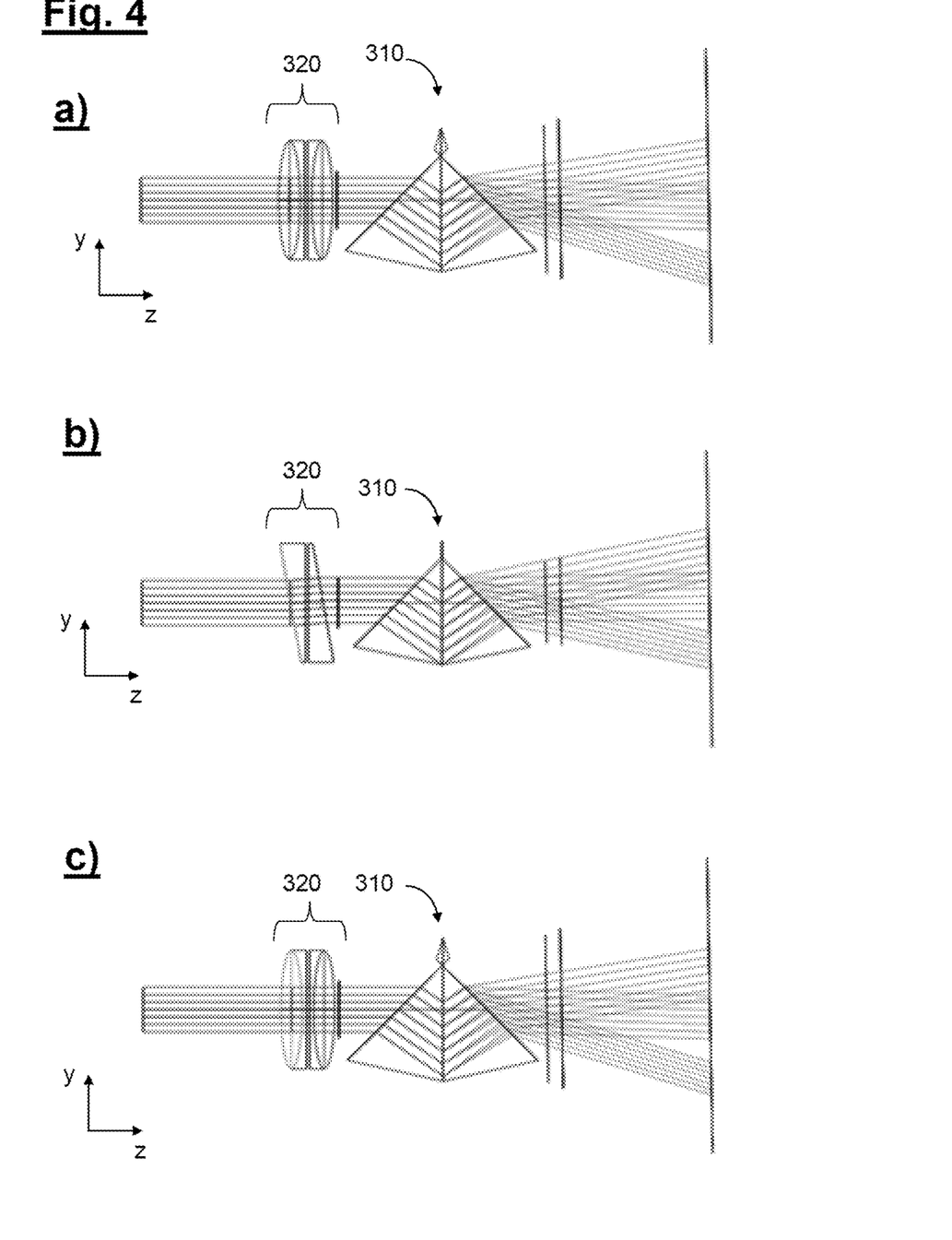

The two-dimensional beam deflection is achieved during operation of the device of FIG. 1-2 on the one hand by the wavelength of the light source being tuned (which leads to the beam deflection schematically indicated in FIG. 2a-2d by means of the first component 110, or the grating prism, in the y-z plane) and on the other hand by a continuous counter-rotational movement of the two prisms of the second component 120 taking place (which leads to the beam deflection schematically indicated in FIG. 1a-1d in the x-z plane).

It is essential for the functional principle in this case that, in respect of the beam deflection taking place according to FIG. 1a-1d in the x-z plane, the first component 110, or the grating prism, does not itself cause any beam deflection, so that in this regard the beam deflection is based only on the second component 120 (i.e. the prism pair).

Conversely, for the beam deflection taking place according to FIG. 2a-2d in the y-z plane, which is caused as a result of the wavelength tuning by the first component 110, or the grating prism, the second component 120, or the prism pair, effectively appears essentially at any time as a plane plate (with a time-varying diameter because of the rotation) and therefore itself causes no beam deflection in the sense of a deflection angle in this direction, or in the y-z plane (possibly only a side offset of the ray bundle, which is generally noncritical but may also be corrected computationally, is caused).

The order selected for the optical components 110, 120 in the embodiment of FIG. 1-2 is advantageous on the one hand insofar as the angles of incidence of the light existing for the first component 110, or the grating prism, remain unchanged independently of the rotation angle of the prisms, and on the other hand the lateral dimensions of the grating prism can also be minimized because of the placement at the light entry in the overall arrangement consisting of the first and second components.

The invention is not, however, restricted to the order described above. In this regard, FIG. 3a-3c and FIG. 4a-4c show similar representations of a further possible embodiment with a correspondingly interchanged order, so that light generated by the tunable light source and striking the arrangement in this case strikes first the second optical component 320 (i.e. the prism pair) and only then the first optical component 310 (or the grating prism).

The representations of FIG. 3a-3c respectively show the arrangement in plan view (i.e. in the x-z plane in the coordinate system indicated) and for different rotation angles of the counter-rotating prisms of the component 320, the position according to FIG. 3a corresponding to a rotation angle of 0°, the position according to FIG. 3b corresponding to a rotation angle of 90° and the position according to FIG. 3c corresponding to a rotation angle of 180°.

The prisms of the component 320 may (without the invention being restricted thereto) for example be made of borosilicate crown glass (for example the glass material commercially available under the designation BK7® from Schott). The wedge angle of the prism pair forming the component 320 is 10° in the exemplary embodiment, the resulting deflection angle varying between −17° and +17°. Furthermore, in the exemplary embodiment (but without the invention being restricted thereto), the first optical component 310, or the grating prism, is made of silicon (Si), the grating period being 413.2 nm (corresponding to a line density of 2420 lines/mm).

FIG. 4a-4c show similar representations for the side view (i.e. in the y-z plane in the coordinate system indicated), again the position according to FIG. 4a corresponding to a rotation angle of 0°, the position according to FIG. 4b corresponding to a rotation angle of 90° and the position according to FIG. 4c corresponding to a rotation angle of 180°.

The form of the first optical component 110 or 310 selected in the above-described embodiments of FIG. 1 to FIG. 4 as a (high-grade-dispersive) grating prism is particularly advantageous insofar as the tuning range, which is required for the two-dimensional scanning process, of the at least one light source may be relatively small. On the one hand, this takes account of the fact that the wavelength range usable to this extent in the region of a typical working wavelength of 1500 nm is relatively small with a view to the transmission properties to be ensured, and so an already significant variation of the deflection angle with a small wavelength change is desirable. In the aforementioned exemplary embodiment, the dispersion of the first optical component 310, or of the grating prism, gives a change in the deflection angle by about 0.30° for a wavelength change by 1 nm at a wavelength of 1530 nm, a change in the deflection angle by about 0.24° for a wavelength change by 1 nm at a wavelength of 1580 nm and a change in the deflection angle by about 0.21° for a wavelength change by 1 nm at a wavelength of 1625 nm.

On the other hand, with corresponding minimization of the tuning range of the light source because of the use of a high-grade-dispersive grating prism, the possibly undesired effect of a wavelength dependency of the beam deflection on sides of the second component 120 or 320, or of the prism pair, which would in principle lead to a trapezoidal image field, can be kept small.

In this case, a "high-grade-dispersive grating prism" is intended to mean a grating prism in which the change in the deflection angle when detuning the wavelength by 1 nm is at least 0.1°, in particular at least 0.2°, more particularly at least 0.3°.

In further embodiments, instead of a single grating, an arrangement of a plurality of gratings on sides of the first (i.e. "wavelength-dependently operating") optical component may be used in order to increase the angle deflection or extend the achievable angle range of the angle deflection.

The two-dimensionally scanning beam deflection according to the invention may be used in an exemplary, advantageous application in a LIDAR system on the basis of the conventional structure described with the aid of FIG. 5a-5b (with corresponding configuration of the scanning device 55 with the arrangement according to the invention consisting of the first optical component and the second optical component).

The invention is not, however, restricted to this application, but may very generally be carried out advantageously in applications in which rapid two-dimensional beam deflection is desired.

Although the invention has been described with the aid of particular embodiments, many variations and alternative embodiments are available to the person skilled in the art, for example by combining and/or interchanging features of individual embodiments. Correspondingly, the person skilled in the art will understand that such variations and alternative embodiments are included by the present invention and the range of the invention is restricted only in the sense of the appended patent claims and their equivalents.

The invention claimed is:

1. A device for two-dimensionally scanning beam deflection of a light beam, comprising:
    at least one spectrally tunable light source configured to emit a light beam having a time-varying wavelength;
    a first optical component comprising a grating or a prism grating and configured to produce a first beam deflection, wherein the first beam deflection is stationary and causes the light beam to be deflected wavelength-dependently only in a first direction, thereby producing a scanning effect in a first of two dimensions while the wavelength is varying; and
    a second optical component configured to produce a second beam deflection, wherein the second beam deflection causes the light beam to be deflected only in a second direction different to the first direction, wherein the second optical component comprises a prism pair comprising two prisms that are rotatably arranged successively in a beam path of the light beam, and wherein the two prisms are configured to perform continuous counter-rotational movements, thereby producing a scanning effect in a second of the two dimensions while the prisms are rotating.

2. The device of claim 1, wherein the two prisms are achromatic prisms.

3. The device of claim 1, wherein the second direction is perpendicular to the first direction.

4. The device of claim 1, wherein the second optical component is arranged after the first optical component along a light propagation direction of the light beam.

5. The device of claim 1, wherein the spectrally tunable light source is configured to simultaneously emit a multiplicity of light beams each having a time-varying wavelength.

6. The device of claim 1, comprising a polarizer.

7. A LIDAR system for a scanning distance determination of an object, the system comprising:
    a spectrally tunable light source configured to emit a light beam having a time-varying wavelength,
    an evaluation unit configured to determine a distance of the object on the basis of measurement signals originating from the light beam and reflected at the object and reference signals not reflected at the object; and
    the device of claim 1.

8. A device for two-dimensionally scanning beam deflection of a light beam, comprising:
    at least one spectrally tunable light source configured to simultaneously emit a multiplicity of light beams each having a time-varying wavelength,
    a first optical component comprising a grating or a prism grating and configured to produce a first beam deflection, wherein the first optical component is stationary and the first beam deflection causes the light beams to be deflected wavelength-dependently only in a first direction, thereby producing a scanning effect in a first of two dimensions while the wavelength is varying; and
    a second optical component configured to produce a second beam deflection, wherein the second beam deflection causes the light beams to be deflected only in a second direction different to the first direction, wherein the second optical component comprises a prism pair comprising two prisms that are rotatably arranged successively in a beam path of the light beam for producing a scanning effect in a second of the two dimensions while the prisms are rotating.

9. The device of claim 8, wherein the two prisms are achromatic prisms.

10. The device of claim 8, wherein the second direction is perpendicular to the first direction.

11. The device of claim 8, wherein the second optical component is arranged after the first optical component along a light propagation direction of the light beam.

12. The device of claim 8, comprising a polarizer.

13. A LIDAR system for a scanning distance determination of an object, the system comprising:
    a spectrally tunable light source configured to emit a light beam having a time-varying wavelength,
    an evaluation unit configured to determine a distance of the object on the basis of measurement signals originating from the light beam and reflected at the object and reference signals not reflected at the object; and
    the device of claim 8.

14. A device for two-dimensionally scanning beam deflection of a light beam, comprising:
    at least one spectrally tunable light source configured to emit a light beam having a time-varying wavelength;

a first optical component comprising a grating or a prism grating and configured to produce a first beam deflection, wherein the first optical component is stationary and the first beam deflection causes the light beam to be deflected wavelength-dependently only in a first direction, thereby producing a scanning effect in a first of two dimensions while the wavelength is varying; and a second optical component configured to produce a second beam deflection, wherein the second beam deflection causes the light beam to be deflected only in a second direction different to the first direction, wherein the second optical component comprises a prism pair comprising two achromatic prisms that are rotatably arranged successively in a beam path of the light beam for producing a scanning effect in a second of the two dimensions while the prisms are rotating.

15. The device of claim 14, wherein the second direction is perpendicular to the first direction.

16. The device of claim 14, wherein the second optical component is arranged after the first optical component along a light propagation direction of the light beam.

17. The device of claim 14, comprising a polarizer.

18. A LIDAR system for a scanning distance determination of an object, the system comprising:

a spectrally tunable light source configured to emit a light beam having a time-varying wavelength, an evaluation unit configured to determine a distance of the object on the basis of measurement signals originating from the light beam and reflected at the object and reference signals not reflected at the object; and the device of claim 14.

* * * * *